United States Patent Office 3,261,845
Patented July 19, 1966

3,261,845
N-PHENYL DERIVATIVES OF 3,6-EPOXY-HEXAHYDROPHTHALIMIDE
Earl R. Bockstahler, Acton, Ind., assignor to The Dow Chemical Company, Midland, Mich., a corporation of Delaware
No Drawing. Filed Feb. 23, 1965, Ser. No. 434,608
14 Claims. (Cl. 260—326)

This is a continuation-in-part of my prior copending applications, Serial No. 269,795, filed April 1, 1963 and Serial No. 382,650, filed July 14, 1964, both now abandoned. Application Serial No. 269,795 was in turn a continuation-in-part of my prior application, Serial No. 213,861, filed August 1, 1962 and now abandoned and application Serial No. 382,650 was a continuation-in-part of my prior application, Serial No. 213,863, filed August 1, 1962, and now abandoned.

The invention relates to novel organic compounds and the preparation thereof, and more particularly relates to substituted N-phenyl derivatives of exo-cis-3,6-epoxyhexahydrophthalimide.

The novel substituted N-phenyl-exo-cis-3,6-epoxyhexahydrophthalimides of the invention may be represented by the following formula:

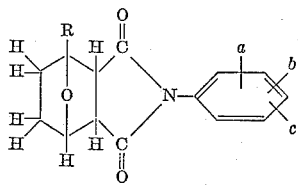

wherein $a$ represents Cl, Br, F, $CF_3$, $CH_3$, $C_2H_5$, $NO_2$, —$SCH_3$, —$OCH_3$, —$OC_2H_5$ or

$b$ represents H, Cl, Br, $CH_3$ or $NO_2$
$c$ represents H, Cl, Br or $NO_2$ and R represents H or —$CH_3$ The present compounds are crystalline solids which are somewhat soluble in many common organic solvents and of rather low solubility in water. The compounds are adapted to be employed as active toxicants in compositions useful as vermicides and for the control of a number of species of mites, insects and bacterial, fungal and protozoan organisms. These compounds have also been found to serve as anticonvulsants in small rodents and are, therefore, useful in the study of the effects of drugs on the nervous system in such rodents as rats and mice.

The compounds of the invention may be prepared by reacting the appropriate substituted anilines with exo-cis-3,6-epoxyhexahydrophthalic acid, or the anhydride thereof. Reaction is brought about by heating the reactants either rapidly or slowly, as desired, to a reaction temperature in the range of about 125°–300° C., more preferably to a temperature in the range of 170°–225° C., and maintaining the reaction temperature until the cyclic imide forms. It will be apparent that to obtain the series of compounds in which R, in the above formula, represents hydrogen, unsubstituted exo-cis-3,6-epoxyhexahydrophthalic acid, or its anhydride, is employed, while the series in which R represents methyl is produced by employing 3-methyl-exo-cis-3,6-epoxyhexahydrophthalic acid or the corresponding anhydride thereof. In practice, the amounts of the reactants to be employed are not critical, some product being formed regardless of the proportions used. Preferably, however, substantially equimolar amounts of the reactants are used, although a small excess of the amine, e.g., up to about 10 percent by weight, may be employed if desired to assure reaction of substantially all the 3,6-epoxyhexahydrophthalic acid or 3-methyl-3,6-epoxyhexahydrophthalic acid or their anhydrides. Upon a completion of the reaction, the reaction product may be purified by conventional procedures, such as washing, extraction and recrystallization.

The compounds of the invention are formed at the above-described reaction temperatures in good yields and do not evidence decomposition on melting even though many of the compounds have such high melting points as over 180° C. This evidence of thermal stability is surprising in view of the known thermal instability of delta-4-tetrahydrophthalimides as taught by Tawney in U.S. Patent 2,524,145.

The following examples merely illustrate the invention and are not to be construed as limiting.

EXAMPLE 1

*N-2,3-dichlorophenyl-3,6-epoxyhexahydrophthalimide*

A mixture of 32.4 grams 2,3-dichloroaniline and 37 grams 3,6-epoxyhexahydrophthalic acid hydrate was heated four hours at 240°–250° C., then poured into alcohol and allowed to stand for crystallization. The 3,6-epoxyhexahydrophthalic acid used, according to the work of Woodward and Baer, J. Am. Chem. Soc., 70, 1161 (1948), was in the exo-cis configuration, i.e., the carboxyl carbons both extend from the plane of the ring on the same side as the oxygen bridge. A crop of crystals which melted at 158°–160° was obtained. These were purified by recrystallization from alcohol and then melted at 160°–161° C. The results of analyses confirmed that the constitution of this material was that of the desired product, N-(2,3-dichlorophenyl)-3,6-epoxyhexahydrophthalimide.

By similar methods, except that in some instances the anhydride of 3,6-epoxyhexahydrophthalic acid was used in place of the corresponding acid hydrate employed above, and using appropriate ring-substituted nitroanilines, haloanilines, alkylanilines and alkoxyanilines in place of 2,3-dichloroaniline, there were prepared the following 3,6-epoxyhexahydrophthalimides:

| Amine reactant | 3,6-epoxyhexahydrophthalimide product | Product M.P., °C. |
|---|---|---|
| 4-chloroaniline | N-4-chlorophenyl | 194–195 |
| 4-methylaniline | N-4-methylphenyl | 182.5–183.5 |
| 4-methoxyaniline | N-4-methoxyphenyl | 188–190 |
| 4-ethoxyaniline | N-4-ethoxyphenyl | 173–174 |
| 4-bromoaniline | N-4-bromophenyl | 206–208 |
| 3-chloroaniline | N-3-chlorophenyl | 153–154 |
| 3-methylaniline | N-3-methylphenyl | 160–161 |
| 2-chloroaniline | N-2-chlorophenyl | 163–164 |
| 2-methylaniline | N-2-methylphenyl | 166–167 |
| 2-methoxyaniline | N-2-methoxyphenyl | 149.5–150.5 |
| 2-ethoxyaniline | N-2-ethoxyphenyl | 129–130 |
| 2-bromoaniline | N-2-bromophenyl | 159–160 |
| 2-ethylaniline | N-2-ethylphenyl | 123–125 |
| 3-trifluoromethylaniline | N-3-trifluoromethylphenyl | 196–198 |
| 2,4-dichloroaniline | N-2,4-dichlorophenyl | 151–152 |
| 2,5-dichloroaniline | N-2,5-dichlorophenyl | 179–180 |
| 2,6-dichloroaniline | N-2,6-dichlorophenyl | 189–190 |
| 3,4-dichloroaniline | N-3,4-dichlorophenyl | 197–198 |
| 3,5-dichloroaniline | N-3,5-dichlorophenyl | 154–155 |
| 2,4,5-trichloroaniline | N-2,4,5-trichlorophenyl | 183–184 |
| 2,4,6-trichloroaniline | N-2,4,6-trichlorophenyl | 198–199 |
| 2,6-dibromoaniline | N-2,6-dibromophenyl | 228.5–229.5 |
| 2,4,6-tribromoaniline | N-2,4,6-tribromophenyl | 210–211 |
| 2,4-dimethylaniline | N-2,4-dimethylphenyl | 180.5–181.5 |
| 2,6-dimethylaniline | N-2,6-dimethylphenyl | 186–188 |
| 3,4-dimethylaniline | N-3,4-dimethylphenyl | 169–170 |
| 2-chloro-4-methylaniline | N-2-chloro-4-methylphenyl | 154–155 |
| 4-chloro-2-methylaniline | N-4-chloro-2-methylphenyl | 173–174 |
| 2-chloro-6-methylaniline | N-2-chloro-6-methylphenyl [1] | 213–215 |
| 2-chloro-6-methylaniline | N-2-chloro-6-methylphenyl [1] | 216–218 |
| 2-chloro-5-methylaniline | N-2-chloro-5-methylphenyl | 173–174 |
| 5-chloro-2-methylaniline | N-5-chloro-2-methylphenyl | 175–176 |
| 3-chloro-2-methylaniline | N-3-chloro-2-methylphenyl | 155–156 |
| 3-chloro-4-methylaniline | N-3-chloro-4-methylphenyl | 203–204 |
| 2-chloro-5-trifluoromethylaniline | N-2-chloro-5-trifluoromethylphenyl | 138–139 |
| 4-fluoroaniline | N-4-fluorophenyl | 168–169 |
| 3-nitroaniline | N-3-nitrophenyl | 209–210 |
| 4-nitroaniline | N-4-nitrophenyl | 209–210 |
| 2-nitroaniline | N-2-nitrophenyl | 192.5–193.5 |
| 3,5-dinitroaniline | N-3,5-dinitrophenyl | 205–206 |
| 2-methyl-4-nitro-5-chloroaniline | N-2-methyl-4-nitro-5-chlorophenyl | 185.5–186.5 |
| 2-methyl-3,5-dinitroaniline | N-2-methyl-3,5-dinitrophenyl | 228–229 |
| 2(methylmercapto)-aniline | N-2(methylmercapto)phenyl | 202–203 |
| 3(methylmercapto)-aniline | N-3(methylmercapto)phenyl | 184–185 |
| 4(methylmercapto)-aniline | N-4(methylmercapto)phenyl | 174–175 |
| 2-chloro-4(methylmercapto)-aniline | N-2-chloro-4(methylmercapto)phenyl | 161–162.5 |
| 2,3-dichloro-4(methylmercapto)aniline | N-2,3-dichloro-4(methylmercapto)phenyl | 200–202 |
| 2,5-dichloro-4(methylmercapto)aniline | N-2,5-dichloro-4(methylmercapto)phenyl | 193–194 |

[1] Stereoisomers.

EXAMPLE 2

Twenty grams of 4-chloroaniline and 34 grams of 3,6-epoxy-3-methyl-hexahydrophthalic acid were mixed and heated together for 5 hours at 200° C. The resulting liquid reaction product was solidified by cooling and recrystallized two successive times from alcohol to obtain N - (4 - chlorophenyl) - 3 - methyl - 3,6 - epoxyhexahydrophthalimide as a crystalline solid, melting at 174.5°–176° C.

In similar fashion, 2,3-dichloroaniline is reacted with an equimolar proportion of 3,6-epoxy-3-methyl-hexahydrophthalic anhydride to produce N-(2,3-dichlorophenyl)-3-methyl-3,6-epoxyhexahydrophthalimide as a crystalline solid having a molecular weight of about 327 and 2-methyl-4-chloroaniline is reacted with an equimolar proportion of 3,6-epoxy-3-methyl-hexahydrophthalic acid to produce N-(2-methyl-4-chlorophenyl)-3-methyl-3,6-epoxyhexahydrophthalimide as crystalline solid having a molecular weight of about 306.

EXAMPLE 3

A mixture of 22.5 grams of 3-acetylaniline and 35 grams of exo-cis-3,6-epoxyhexahydrophthalic acid hydrate was heated gradually to 190°–200° C. and held at this temperature thirty minutes, then poured into alcohol and allowed to stand for crystallization. The 3,6-epoxyhexahydrophthalic acid used, according to the work of Woodward and Baer, J. Am. Chem. Soc., 70, 1161 (1948), was in the exo-cis configuration, i.e., the carboxyl carbons both extend from the plane of the ring on the same side as the oxygen bridge. A crop of crystals was obtained which, after purification by recrystallization from dioxane, melted at 183°–184° C. Analyses showed that this material was exo-cis-N-3-acetylphenyl-3,6-epoxyhexahydrophthalimide.

In a manner similar to the foregoing example, exo-cis-N-2 - acetylphenyl - 3,6 - epoxyhexahydrophthalimide and exo-cis-N - 4 - acetylphenyl - 3,6 - epoxyhexahydrophthalimide are prepared using 2-acetylaniline and 4-acetylaniline, respectively, in place of 3-acetylaniline.

EXAMPLE 4

Determinations were carried out to compare the effectiveness of N(3 - acetylphenyl) - 3,6 - epoxyhexahydrophthalimide, representative of the compounds of the present invention, with the prior art compounds, N(phenyl)-3,6-epoxyhexahydrophthalimide and 3,6-epoxyhexahydrophthalimide. Each compound under test was incorporated by thorough mixing with a balanced rodent food in an amount to provide 0.06 percent by weight of such compound in the resulting feed composition. Such compositions were prepared containing one of the compounds N(3 - acetylphenyl) - 3,6 - epoxyhexahydrophthalimide, N(phenyl)-3,6-epoxyhexahydrophthalimide or 3,6-epoxyhexahydrophthalimide. Each such composition was fed to a separate group of mice naturally infested with pinworms and tapeworms. Feeding of such composition as the sole diet was continued for seven days and the mice were then sacrificed. The gastro-intestinal tracts of said mice were dissected and examined microscopically to determine the presence or absence of pinworms and tapeworms. The results are summarized in the following table, wherein the first column shows the group substituted on the nitrogen in 3,6-epoxyhexahydrophthalimide and wherein 0 percent control indicates that the extent of infestation in the treated mice was essentially equal to that in similar naturally infested mice maintained on the same basal diet without admixture of any test compound.

| Substituent on 3,6-epoxy-hexahydrophthalimide | Percent Control of— | |
|---|---|---|
|  | Pinworms | Tapeworms |
| N(3-acetylphenyl) | 100 | 100 |
| N(phenyl) | 0 | 0 |
| Hydrogen (unsubstituted) | 0 | 0 |

For anthelmintic uses, the compounds may be incorporated in the animal feed diet at the rate of about 0.05 to 1 percent by weight. In a representative operation in which exo-cis-N-3-acetylphenyl-3,6-epoxyhexahydrophthalimide was incorporated in animal feed at a level of 0.12 percent by weight, complete control of both tapeworms and pinworms in mice was obtained.

Especially useful groups of the present compounds include the N-chlorophenyl, N-bromophenyl, N-nitrophenyl and N-chloromethylphenyl derivatives, wherein the respective halo or nitro substitutions on the ring occur 1 to 3 times.

The products of the present invention are useful for the control of various plant and animal infesting pests as well as for the control of various bacteria and fungi and for studying the nervous system in small rodents. While all the compounds of the invention exhibit one or more of the activities named herein, they do not all exhibit each activity to the same degree. Therefore, for any given use, some of these compounds are to be more preferred than others.

In a representative operation for the control of cockroaches, exo-cis-N-2,4,6-trichlorophenyl-3,6-epoxyhexahydrophthalimide was dispersed in water to prepare an aqueous spray composition containing 500 parts per million of the phthalimide test compound. This composition was applied to cockroach nymphs so as to entirely wet them. Inspection after three days indicated good control of the cockroach nymphs was obtained.

In a representative operation for the control of two-spotted spider mites, exo-cis-N-4-fluorophenyl-3,6-epoxyhexahydrophthalimide was dispersed in water to prepare an aqueous spray composition containing 0.06 percent by weight of the epoxyhexahydrophthalimide test compound. This composition was applied to cranberry bean plants in amounts sufficient to wet the foliage. The plants had been infested with two-spotted spider mites before wetting the foliage. The leaf surfaces were then allowed to dry. About 3 days later, the plants were examined to ascertain the control of two-spotted spider mites attributable to the test compound. It was found that good kills of two-spotted spider mites were obtained.

In preparing a toxicant composition containing one of the compounds of the present invention, the compound may be dispersed in water with or without the aid of a surface active agent and employed as a spray. The compound may be prepared as an active constituent in a solvent solution, oil-in-water or water-in-oil emulsion, or as an aqueous dispersion. If desired, the compounds may be used in formulating a composition comprising a carrier dust, e.g., of wood flour, or in making a composition comprising a wettable powder. Typical aqueous dispersions of the compounds contain from 5 parts per million to 1 percent by weight of the compound.

Example 5

Representative compounds of the invention were incorporated by thorough mixing with a balanced mouse food in an amount to provide 0.06 percent by weight of one of the compounds in the resulting feed compositions. For comparison purposes, a series of exactly similar feed compositions were prepared incorporating 0.06 percent by weight of one of the prior art compounds, viz., 3,6-epoxyhexahydrophthalimide and N-(phenyl)-3,6-epoxyhexahydrophthalimide, or of a compound having a structure somewhat related to that of the compounds of the invention, viz., N-(2,4-dichlorophenyl) phthalimide and N-(4-chloro-2-methylphenyl) (cyclohexane-1,2-dicarboxylic acid)imide. Groups of mice infested with pinworms were fed one of the above feed compositions for 7 days and were then sacrificed. The gastro-intestinal tracts of said mice were dissected and examined microscopically to determine the presence or absence of pinworms. The results are summarized in the following table wherein the first column, unless otherwise indicated, shows the groups substituted on the nitrogen in 3,6-epoxyhexahydrophthalimide.

| Substituent on 3,6-epoxy-hexahydrophthalimide: | Percent control of pinworms |
|---|---|
| N-2-methylphenyl | 100 |
| N-3-methylphenyl | 100 |
| N-2-methyl-4-chlorophenyl | [1] 100 |
| N-2-bromophenyl | 100 |
| N-4-methoxyphenyl | 100 |
| Hydrogen (unsubstituted) | 0 |
| N-methyl | 0 |
| N-phenyl | 0 |

[1] Slight signs of toxicity to mouse at this dosage.

The comparison compounds N(2,4-dichlorophenyl) phthalimide and N(4-chloro-2-methylphenyl) (cyclohexane-1,2-dicarboxylic acid)imide likewise gave zero control of pinworms in this test.

Example 6

Feed compositions, prepared as in Example 3, were fed in exactly similar fashion to mice naturally infested with tapeworms. The necropsy results are summarized in the following table.

| Substituent on 3,6-epoxyhexahydrophthalimide: | Percent control of tapeworms |
|---|---|
| N-2-methoxyphenyl | 100 |
| N-4-methoxyphenyl | 100 |
| N-2-methyl-5-chlorophenyl | 100 |
| N-2-methyl-6-chlorophenyl | 100 |
| N-3-chloro-4-methylphenyl | 100 |
| N-2-bromophenyl | 100 |
| N-2,4,6-tribromophenyl | 100 |
| N-2-ethylphenyl | 100 |
| N-3,4-dimethylphenyl | 100 |
| Hydrogen (unsubstituted) | 0 |
| N-methyl | 0 |
| N-phenyl | 0 |

The substituted phthalimide and cyclohexanedicarboximide comparison compounds employed as in Example 3 were likewise ineffective on tapeworms.

Example 7

Compounds of the invention were suspended in an aqueous medium and administered in graduated doses to mice either by intraperitoneal injection (I.P.) or intragastrically (I.G.) by tube. Thereafter the mice were tested by a standard electric shock to the head. The current and voltage were adjusted to about six times threshold strength. Under these conditions, substantially 100 percent of untreated mice undergo convulsions when submitted to the shock procedure. The results are reported in terms of the 50 percent effective dose ($ED_{50}$), that is, the dose in milligrams of compound per kilograms of mouse necessary to protect 50 percent of mice against convulsions when shocked in the above manner. The results are summarized in the following table.

| Substituent on 3,6-epoxy-hexahydrophthalimide | Route | Electroshock Protection, $ED_{50}$ |
|---|---|---|
| N-2-chlorophenyl | I.G. | 112 |
| N-4-chlorophenyl | I.P. | 71 |
| N-2,3-dichlorophenyl | I.G. | 27 |
| N-2,4-dichlorophenyl | I.G. | 43.5 |
| N-3,5-dichlorophenyl | I.G. | 49 |
| N-2-methyl-4-chlorophenyl | I.G. | 105 |
| N-2-methyl-3-chlorophenyl | I.G. | 24.5 |
| N-2-chloro-5-trifluoromethylphenyl | I.G. | 50 |
| N-(4-chlorophenyl)-(3-methyl-3,6-epoxy-hexahydrophthalimide) | I.P. | 39.8 |

In the foregoing test, N-phenyl-3,6-epoxyhexahydrophthalimide was ineffective at a dosage of 200 mg./kg. (I.G.) and N(4-chlorophenyl)-3,6-endomethylenehexahydrophthalimide was ineffective at a dosage of 300 mg./kg. (I.P.).

The nitrogen-containing ring in my compounds is moderately labile and can be opened by contacting the imide compounds with strong aqueous alkalis to form compounds containing both a carboxamide group and a carboxyl group on the 3,6-epoxyhexahydrophthalic acid structure. For many uses the compounds can be employed in this partially hydrolyzed form with equally good results.

The exo-cis-3,6-epoxyhexahydrophthalic acid or exo-cis-3-methyl-3,6-epoxyhexahydrophthalic acid employed as starting materials in accordance with the present teachings may be prepared, according to known procedures, by the reaction of furan or 2-methylfuran, respectively, with maleic anhydride. The adducts formed are illustrated by the following structural formula:

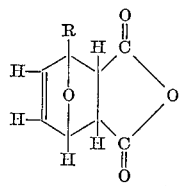

wherein R is hydrogen or methyl.

The so-formed adduct is converted to a sodium salt and hydrogenated to the hexahydro form, being then isolated as the dicarboxylic acid hydrate having the following structural formula:

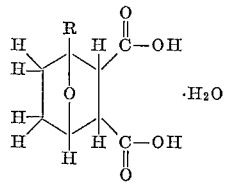

The corresponding anhydride may then be obtained, if desired, by distilling the foregoing acid hydrate under reduced pressure.

I claim:
1. A compound having the formula

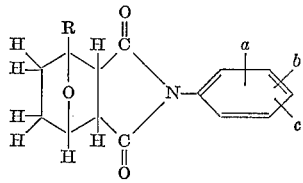

wherein $a$ is selected from the group consisting of Cl, Br, F, $CF_3$, $CH_3$, $C_2H_5$, $NO_2$, $-SCH_3$, $-OCH_3$, $-OC_2H_5$ and $$-\overset{O}{\underset{\|}{C}}-CH_3$$

$b$ is selected from the group consisting of H, Cl, Br, $CH_3$ and $NO_2$, $c$ is selected from the group consisting of H, Cl, Br and $NO_2$ and R is selected from the group consisting of hydrogen and methyl, the compound being in the exo-cis configuration.

2. Exo - cis-N-chlorophenyl-3,6-epoxyhexahydrophthalimide.
3. Exo - cis - N - bromophenyl - 3,6-epoxyhexahydrophthalimide.
4. Exo - cis - N - nitrophenyl - 3,6 - epoxyhexahydrophthalimide.
5. Exo - cis - N - chloromethylphenyl - 3,6-epoxyhexahydrophthalimide.
6. Exo - cis - N - 4 - chlorophenyl - 3,6 - epoxyhexahydrophthalimide.
7. Exo - cis - N - 3,5 - dichlorophenyl - 3,6 - epoxyhexahydrophthalimide.
8. Exo - cis - N - 4 - bromophenyl - 3,6 - epoxyhexahydrophthalimide.
9. Exo - cis - N - 3 - chlorophenyl - 3,6 - epoxyhexahydrophthalimide.
10. Exo - cis - N - 3,5 - dinitrophenyl - epoxyhexahydrophthalimide.
11. Exo - cis - N-3-nitrophenyl-epoxyhexahydrophthalimide.
12. Exo - cis - N(4 - chlorophenyl)-3-methyl-3,6-epoxyhexahydrophthalimide.
13. Exo - cis - N - (acetylphenyl) - 3,6 - epoxyhexahydrophthalimide.
14. Exo - cis - N - (2,4 - dichlorophenyl) - 3,6 - epoxyhexahydrophthalimide.

References Cited by the Examiner
UNITED STATES PATENTS

| | | | |
|---|---|---|---|
| 2,524,145 | 10/1950 | Tawney | 260—326 |
| 2,545,283 | 3/1951 | Johnson | 260—326 |
| 2,900,243 | 8/1959 | Lewis | 260—326 |

OTHER REFERENCES

Kraft et al., Zhur. Obshchei Khimii, vol. 26, 1956, pages 213–218.

HENRY R. JILES, *Acting Primary Examiner.*

MARY O'BRIEN, *Assistant Examiner.*